US012711364B2

(12) United States Patent
Ostapenko et al.

(10) Patent No.: US 12,711,364 B2
(45) Date of Patent: Aug. 18, 2026

(54) NEURAL NETWORK OPERATION METHOD AND APPARATUS WITH STACKING-BASED CHANNEL ALIGNMENT

(71) Applicant: Samsung Electronics Co., Ltd., Suwon-si (KR)

(72) Inventors: Maksim Ostapenko, Suwon-si (KR); Hanwoong Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1153 days.

(21) Appl. No.: 17/688,288

(22) Filed: Mar. 7, 2022

(65) Prior Publication Data

US 2023/0086316 A1    Mar. 23, 2023

(30) Foreign Application Priority Data

Sep. 17, 2021 (KR) ........................ 10-2021-0125095

(51) Int. Cl.
*G06N 3/063* (2023.01)
*G06F 13/28* (2006.01)

(52) U.S. Cl.
CPC ............. *G06N 3/063* (2013.01); *G06F 13/28* (2013.01); *G06F 2213/28* (2013.01)

(58) Field of Classification Search
CPC ...................................................... G06N 3/063
USPC .............................................................. 710/3
See application file for complete search history.

(56) References Cited

U.S. PATENT DOCUMENTS 10,489,680 B2 11/2019 Aliabadi et al.
10,726,330 B2 7/2020 Ferdman et al.
11,694,319 B2 * 7/2023 Kang .................... G06F 18/251 382/100
11,868,872 B1 * 1/2024 Minkin ................... G11C 11/54
2018/0061058 A1 * 3/2018 Xu ......................... G06N 3/084
2019/0050992 A1 * 2/2019 Xu ......................... G06N 3/084
2019/0180167 A1 6/2019 Huang et al.
2019/0266485 A1 * 8/2019 Singh .................... G06F 9/3001
2019/0303715 A1 * 10/2019 Jiang ...................... G06N 3/084
2019/0340490 A1 * 11/2019 Fishel ...................... G06N 3/08
2020/0175095 A1 * 6/2020 Morariu ................ G06F 40/117
2020/0192631 A1 6/2020 Nemlekar et al.
2020/0193277 A1 * 6/2020 Kwon ................... G06F 7/5443
2020/0242422 A1 * 7/2020 Wang ................. G06V 10/7715
2020/0250459 A1 * 8/2020 Sarshogh ......... G06V 30/18057

(Continued)

FOREIGN PATENT DOCUMENTS

JP 2021-9622 A 1/2021
JP 6856112 B1 4/2021

(Continued)

OTHER PUBLICATIONS

Korean Office Action issued on Sep. 27, 2024, in counterpart Korean Patent Application No. 10-2021-0125095 (3 pages in English, 6 pages in Korean).

*Primary Examiner* — Titus Wong
(74) *Attorney, Agent, or Firm* — NSIP Law

(57) ABSTRACT

A neural network operation method and apparatus are disclosed, where the network operation method including receiving data for a neural network operation, determining whether a size of the data is less than or equal to a threshold, generating stacked data by stacking a portion of the data based on the determining, and performing the neural network operation in parallel based on the stacked data.

12 Claims, 8 Drawing Sheets

(56) References Cited

U.S. PATENT DOCUMENTS

2020/0327308 A1* 10/2020 Cheng .................. G06F 18/253
2021/0004681 A1 1/2021 Tate et al.
2021/0056734 A1* 2/2021 Han ..................... G06T 11/008
2021/0097649 A1* 4/2021 Liu ........................ G06T 5/70
2021/0201147 A1* 7/2021 Tu ...................... G06F 18/2148
2021/0248501 A1 8/2021 Shin
2021/0365716 A1* 11/2021 Li ....................... G06V 10/764
2022/0076056 A1* 3/2022 Aliabadi ............ G06F 18/2113
2022/0137869 A1* 5/2022 Kim ..................... G06F 3/0679
711/154
2022/0147791 A1* 5/2022 Yao ...................... G06V 10/95

FOREIGN PATENT DOCUMENTS

KR 10-2019-0062481 A 6/2019
KR 10-2021-0100335 A 8/2021

* cited by examiner

NEURAL NETWORK OPERATION METHOD AND APPARATUS WITH STACKING-BASED CHANNEL ALIGNMENT

CROSS-REFERENCE TO RELATED APPLICATIONS

This application claims the benefit under 35 USC § 119(a) of Korean Patent Application No. 10-2021-0125095, filed on Sep. 17, 2021, in the Korean Intellectual Property Office, the entire disclosure of which is incorporated herein by reference for all purposes.

BACKGROUND

1. Field

The following description relates to a neural network operation method and apparatus.

2. Description of Related Art

A neural processing unit (NPU) requires data alignment. In the operation of a multiplier accumulator (MAC) system that has a limit on depth alignment and has a depth-first operation order using an input feature map, an unaligned input channel may be used When channel input data is unaligned, a conventional neural network operation method may experience the issue of lowered MAC utilization because unaligned channels generate values that do not contribute to final operation.

Due to the values not contributing to final operation, excessive power may be consumed because the NPU is consuming unnecessary cycles and memory overhead may occur because of a weight and a dummy channel of a feature map.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a neural network operation method including receiving data for a neural network operation, determining whether a size of the data is less than or equal to a threshold, generating stacked data by stacking a portion of the data based on the determining, and performing the neural network operation in parallel based on the stacked data.

The generating of the stacked data may include storing a portion of a first feature map included in the data in a first location of a memory, and generating a stacked feature map by stacking a second feature map included in the data at a location adjacent to the first location.

The generating of the stacked data may include generating the stacked data by stacking one or more of channels included in the first feature map and one or more of channels included in the second feature map in a channel direction.

The generating of the stacked data may include generating a stacked kernel by stacking one or more of kernels included in the data.

The generating of the stacked data may include generating a plurality of tiles by segmenting the data to have a predetermined width or a predetermined height, and generating the stacked data by stacking the plurality of tiles.

The generating of the stacked data may include generating the stacked data, in response to determining that segmenting the data is beneficial.

The generating of the stacked data may include generating the stacked data by inputting the data to a direct memory access (DMA) engine.

The generating of the stacked data may include searching for additional data to perform a second neural network operation that is different from a first neural network operation performed based on the data, determining whether the additional data and the data are stackable, and performing the first neural network operation and the second neural network operation in parallel by stacking the additional data and the data based on a result of determining.

The neural network operation method may include receiving subsequent data of the data, determining whether a size of the subsequent data is less than or equal to a predetermined size and whether the subsequent data is stackable, and performing the neural network operation by stacking a portion of the subsequent data based on a result of determining and a dependency between the data and the subsequent data.

In another general aspect, there is provided a neural network operation apparatus including a receiver configured to receive data for a neural network operation, and a processor configured to determine whether a size of the data is less than or equal to a threshold, generate stacked data by stacking a portion of the data, in response to the data being less than or equal to the threshold, and perform the neural network operation in parallel based on the stacked data.

The processor may be configured to store a portion of a first feature map included in the data in a first location of a memory, and generate a stacked feature map by stacking a second feature map included in the data at a location adjacent to the first location.

The processor may be configured to generate the stacked data by stacking one or more of channels included in the first feature map and one or more of channels included in the second feature map in a channel direction.

The processor may be configured to generate a stacked kernel by stacking one or more of kernels included in the data.

The processor may be configured to generate a plurality of tiles by segmenting the data to have a predetermined width or a predetermined height, and generate the stacked data by stacking the plurality of tiles.

The processor may be configured to generate the stacked data, in response to determining whether segmenting the data is beneficial.

The processor may be configured to generate the stacked data by inputting the data to a direct memory access (DMA) engine.

The processor may be configured to search for additional data to perform a second neural network operation that is different from the first neural network operation performed based on the data, determine whether the additional data and the data are stackable, and perform the first neural network operation and the second neural network operation in parallel by stacking the additional data and the data based on a result of determining.

The receiver may be configured to receive subsequent data of the data, wherein the processor may be configured to determine whether a size of the subsequent data is less than or equal to a predetermined size and whether the subsequent data is stackable, and perform the neural network operation by stacking a portion of the subsequent data based on a result of determining and dependency between the data and the subsequent data.

Other features and aspects will be apparent from the following detailed description, the drawings, and the claims.

Figure 1:
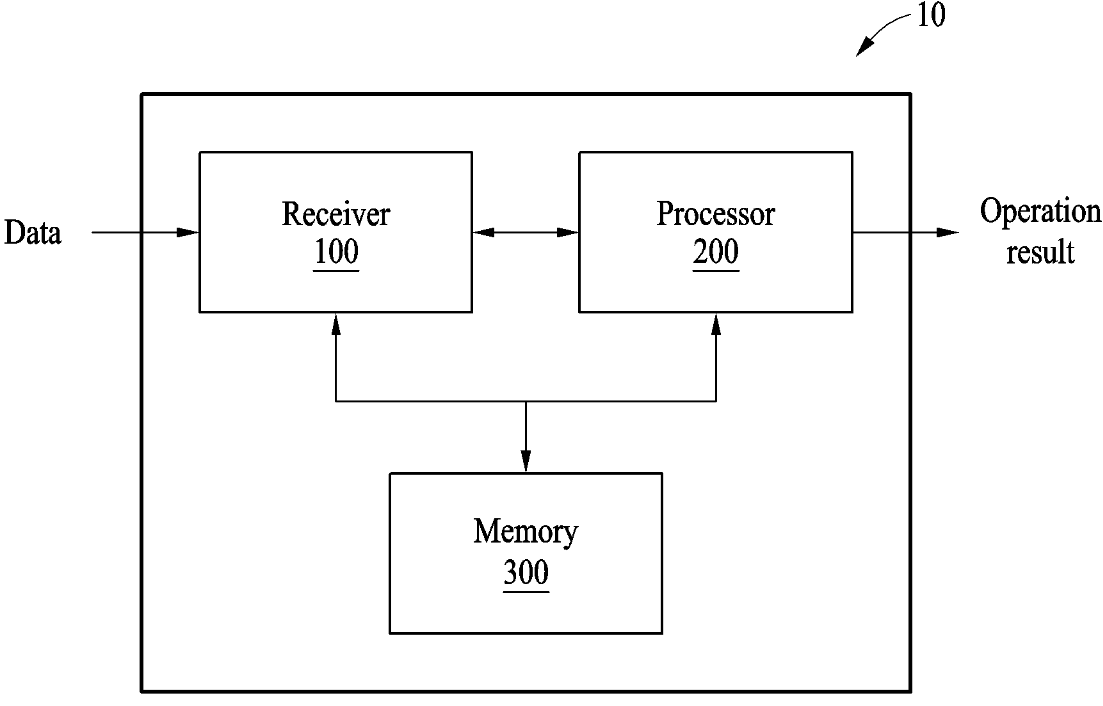
FIG. 1 illustrates an example of a neural network operation apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

The use of the term "may" herein with respect to an example or embodiment (e.g., as to what an example or embodiment may include or implement) means that at least one example or embodiment exists where such a feature is included or implemented, while all examples are not limited thereto.

Hereinafter, example embodiments will be described in detail with reference to the accompanying drawings. When describing the example embodiments with reference to the accompanying drawings, like reference numerals refer to like components and a repeated description related thereto will be omitted.

FIG. 1 illustrates an example of a neural network operation apparatus.

Referring to FIG. 1, a neural network operation apparatus 10 may perform a neural network operation. The neural network operation apparatus 10 may receive data, perform stacking for a portion or all of the data, and perform the neural network operation in parallel using stacked data.

The neural network or an artificial neural network (ANN) may generate mapping between input patterns and output patterns, and may have a generalization capability to generate a relatively correct output with respect to an input pattern that has not been used for training. The neural network may refer to a general model that has an ability to solve a problem, where nodes form the network through synaptic combinations change a connection strength of synapses through training.

The neural network may be a model with a machine learning structure designed to extract feature data from input data and to provide an inference operation based on the feature data. The feature data may be data associated with a feature obtained by abstracting input data. If input data is an image, feature data may be data obtained by abstracting the image and may be represented in a form of, for example, a vector. The neural network may map input data and output data that are in a nonlinear relationship based on deep learning, to perform inference operation. The deep learning, which is a machine learning method used for tasks such as speech recognition or speech transliteration from a big data set, may map input data and output data to each other through supervised and/or unsupervised learning.

The inference operation may include, for example, pattern recognition (e.g., object recognition, facial identification, etc.), sequence recognition (e.g., speech, gesture, and written text recognition, machine translation, machine interpretation, machine transliteration etc.), control (e.g., vehicle control, process control, etc.), recommendation services, decision making, medical diagnoses, financial applications, data mining, and the like.

The neural network may be implemented as an architecture having a plurality of layers including an input image, feature maps, and an output. In the neural network, the input image may be convoluted with a filter called weights, and as a result, a plurality of feature maps may be output. The output feature maps may be again convoluted as input feature maps with the weights, and a plurality of new feature maps may be output. After the convolution operations are repeatedly performed, the recognition results of features of the input image through the neural network may be finally output.

For example, when an image of a 24×24 pixel size is input to the neural network, the input image may be output as feature maps of 4 channels each having a 20×20 size through a convolution operation with weights. Also, some of the pixel values of the feature maps of 4 channels each having the 20×20 size may be subject to a sub-sampling operation, such as, for example, max-pooling and average-pooling, to output feature maps of 4 channels each having a 10×10 size. In an example, the 10×10 feature maps may be repeatedly subject to convolution operations and sub-sampling operations with weights so that the sizes of the 10×10 feature maps may be reduced, and global features may be output. The neural network may repeatedly perform convolution operations and sub-sampling (or pooling) operations on the several layers to filter robust features, i.e., global features that are capable of representing the input image from the input image, to output the global features, and to input the global features to the fully connected layer, thereby recognizing the input image.

In another example, the neural network may receive an input source sentence, (e.g., voice entry) instead of an input image. In such an example, a convolution operation is performed on the input source sentence with a kernel, and as a result, the feature maps are output. The convolution operation is performed again on the output feature maps as input feature maps, with a kernel, and new feature maps are output. When the convolution operation is repeatedly performed as such, a recognition result with respect to features of the input source sentence may be output through the neural network.

Data input to the input layer is processed through hidden layers, and thus an output value is output from the output layer. In this case, the larger the weight is, the stronger the connectivity between two corresponding nodes becomes. On the other hand, the smaller the weight is, the weaker the connectivity between the two corresponding nodes becomes. For example, a weight may have a value between 0 and 1. When the weight is 0, it may indicate that there is no connectivity between two nodes.

On the other hand, as the connectivity through the weight increases, the connectivity of an artificial neural network may be strengthened and the complexity thereof may increase. As a result, memory allocation for storing the weight increases, and the overall operation speed of the artificial neural network may decrease, and thus the efficiency of the artificial neural network may deteriorate.

In an example, training an artificial neural network may indicate determining and updating weights and biases between layers or weights and biases among a plurality of nodes belonging to different layers adjacent to one another. In an example, weights and biases of a plurality of layered structures, a plurality of layers, or nodes may be collectively referred to as connectivity of an artificial neural network. Therefore, training an artificial neural network may indicate construction and training of the connectivity.

The neural network may include a deep neural network (DNN). The neural network may include a convolutional neural network (CNN), a recurrent neural network (RNN), a perceptron, a multiplayer perceptron, a feed forward (FF), a radial basis network (RBF), a deep feed forward (DFF), a long short-term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme training machine (ELM), an echo state network (ESN), a deep residual network (DRN), a differentiable neural computer (DNC), a neural turning machine (NTM), a capsule network (CN), a Kohonen network (KN), and an attention network (AN).

The neural network operation apparatus 10 may be implemented in a personal computer (PC), a data server, or a portable device.

The portable device may be implemented as a laptop computer, a mobile phone, a smart phone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), a handheld game console, an e-book, a smart device, an autonomous vehicle, or a vehicle guidance system. The smart device may be implemented as a smart watch, a smart band, or a smart ring.

The neural network operation apparatus 10 includes a receiver 100 and a processor 200. The neural network operation apparatus 10 may further include a memory 300.

The receiver 100 may receive data for a neural network operation. The receiver 100 may continuously receive data according to the flow of time. The receiver 100 may receive data and subsequent data of the data for the neural network operation according to the flow of time. The receiver 100 may include a receiving interface. The receiver 100 may output the received data to the processor 200. The data for the neural network operation may include a model parameter (or, a weight) of the neural network, data input to the neural network, data output from the neural network, or data for training the neural network. For example, the data for the neural network may include a feature map or a kernel.

The processor 200 may process data stored in the memory 300. The processor 200 may execute a computer-readable code (for example, software) stored in the memory 300 and instructions triggered by the processor 200.

The processor 200 may be a data processing device implemented by hardware including a circuit having a physical structure to perform desired operations. For example, the desired operations may include code or instructions included in a program.

For example, the hardware-implemented data processing device may include a microprocessor, a central processing unit (CPU), a processor core, a multi-core processor, a multiprocessor, an application-specific integrated circuit (ASIC), and a field-programmable gate array (FPGA). Further details regarding the processor 200 is provided below.

The processor 200 may determine whether a size of the data is less than or equal to a size or a threshold. In an example, the size may be predetermined.

The processor 200 may generate stacked data by stacking a portion of data based on a result of determining whether the size of the data is less than or equal to the predetermined size. The processor 200 may store a portion of a first feature map included in the data in a first location of the memory 300. The processor 200 may generate a stacked feature map by stacking a second feature map included in the data at a location adjacent to the first location.

The processor 200 may generate stacked data by stacking one or more of channels included in the first feature map and one or more of channels included in the second feature map in a channel direction.

The processor 200 may generate a stacked kernel by stacking one or more of kernels included in the data.

The processor 200 may determine whether segmenting the data is beneficial. The processor 200 may generate a plurality of tiles by segmenting the data to have a width or a height. In an example, the width and the height may be predetermined. The processor 200 may generate the stacked data by stacking the plurality of tiles.

The processor 200 may generate the stacked data by inputting the data to a direct memory access (DMA) engine.

The processor 200 may search additional data to be used to perform a second neural network operation that is different from a first neural network operation performed based on the data. The processor 200 may determine whether the additional data and the data are stackable. The processor 200 may perform the first neural network operation and the second neural network operation by stacking the additional data and the data based on a result of determining.

The processor 200 may determine whether a size of subsequent data is less than or equal to a predetermined size and whether the subsequent data is stackable. The processor 200 may perform the neural network operation by stacking a portion of the subsequent data based on a result of determining and a dependency between the data and the subsequent data.

The processor 200 may perform the neural network operation in parallel based on stacked data.

The processor 200 may read/write neural network data, for example, text data, voice data, image data, feature map data, kernel data, etc., from/to the memory 920 and execute a neural network using the read/written data. When the neural network is executed, the processor 200 may repeatedly perform convolution operations between an input feature map and a kernel, in order to generate data with respect to an output feature map. Here, a number of operations of the convolution operation may be determined, depending on various factors, such as, for example, the number of channels of the input feature map, the number of channels of the kernel, a size of the input feature map, a size of the kernel, and a precision of a value. The neural network may be implemented as a complicated architecture, where the processor 200 performs the convolution operation with an operation count of up to hundreds of millions to tens of billions, and the frequency at which the processor 200 accesses the memory 300 for the convolution operations rapidly increases.

The memory 300 may store data for an operation or an operation result. The memory 300 may store executable instructions (or programs) by the processor 200. For example, the instructions may include instructions for executing an operation of the processor and/or instructions for performing an operation of each component of the processor.

The memory 300 may be implemented as a volatile memory device or a non-volatile memory device.

The volatile memory device may be implemented as a dynamic random-access memory (DRAM), a static random-access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM(CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory. Further details regarding the memory 300 is provided below.

Figure 2:
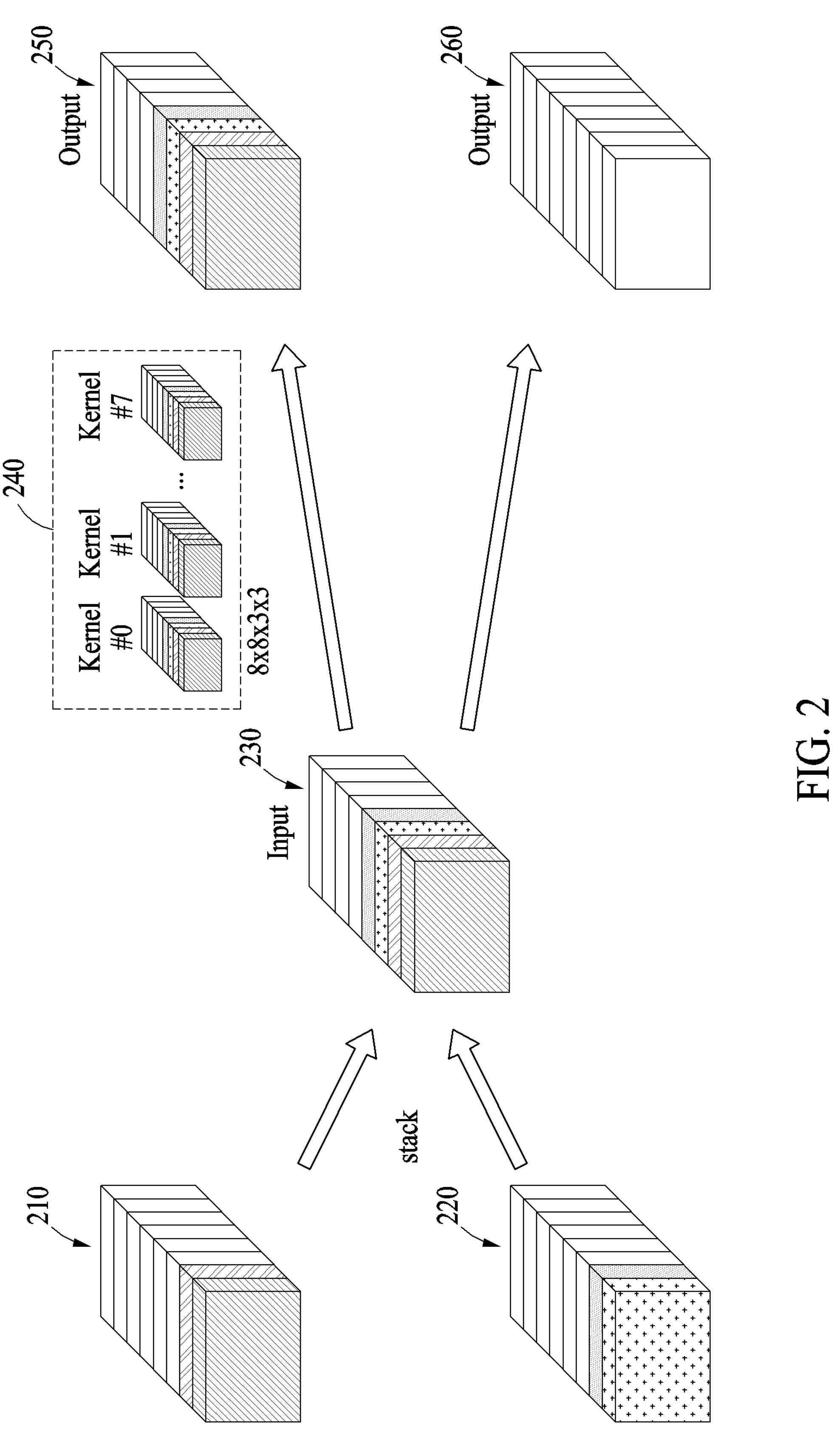
FIG. 2 illustrates an example of an operation of the neural network training apparatus of FIG. 1.

FIG. 2 illustrates an example of an operation of the neural network training apparatus of FIG. 1.

Referring to FIG. 2, a processor (for example, the processor 200 of FIG. 1) may determine whether a size of data is a predetermined size and may stack the data based on a result of determining. For example, the data may include an input feature map.

The processor 200 may stack a plurality of independent neural network operations (for example, a convolution operation) having a small number of unaligned input channels. For example, a conventional neural network operation method requires time to perform two convolution operations that have 8×1022×1022 as an output by performing a convolution having a kernel size is 3×3, stride is 1, and padding is 0 for a 2×1024×1024 input.

The processor 200 may enhance multiplier accumulator (MAC) utilization by fusing a first convolution and a second convolution and may reduce an input feature memory (IFM) footprint.

The processor 200 may generate stacked data 230 by stacking a first feature map 210 and a second feature map 220. The processor 200 may generate a first output 250 and a second output 260 in parallel by performing a neural network operation between the stacked data 230 and a kernel 240.

Figure 3:
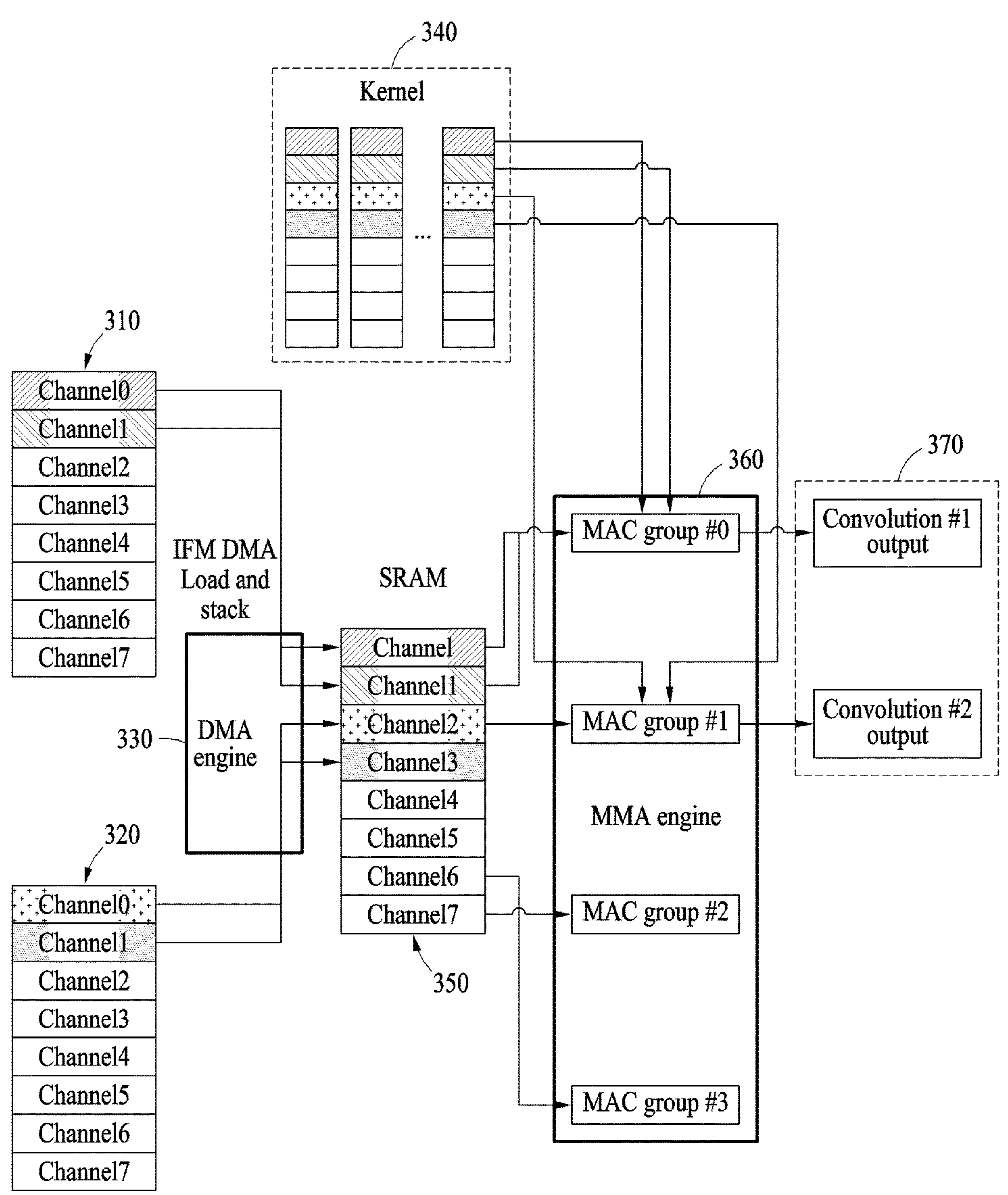
FIG. 3 illustrates an example of an implementation of the neural network operation apparatus of FIG. 1.
Figure 4:
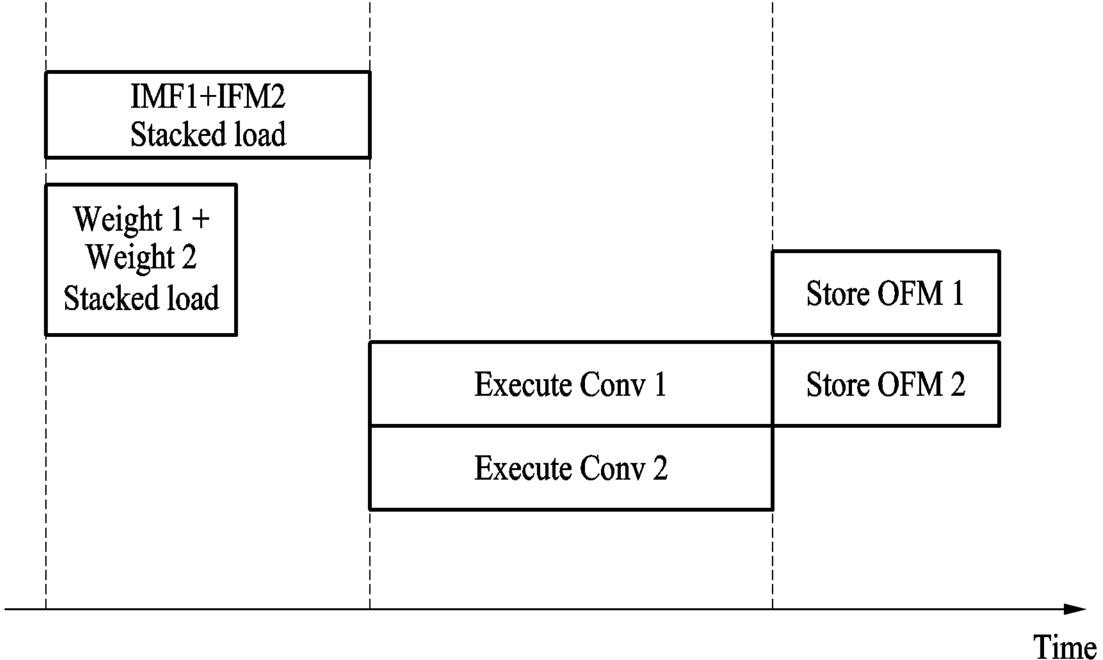
FIG. 4 illustrates an example of operation time of the neural network operation apparatus of FIG. 1.

FIG. 3 illustrates an example of implementation of the neural network operation apparatus of FIG. 1, and FIG. 4 illustrates an example of operation time of the neural network operation apparatus of FIG. 1.

Referring to FIGS. 3 and 4, a processor (for example, the processor 200 of FIG. 1) may reduce operation time by stacking a first feature map 310 and a second feature map 320. The processor 200 may use a DMA as a channel-wise stacker and may reduce operation time by simultaneously performing a plurality of convolution operations using MAC groups (for example, MAC groups #0 to #3) included in a MAC engine 360.

The processor 200 may generate stacked data by inputting data to a DMA engine 330.

The processor 200 may store a portion of the first feature map 310 included in the data in a first location of a memory (for example, SRAM). The processor 200 may generate stacked data 350 by stacking a portion of the second feature map 320 at a location adjacent to the first location. The processor 200 may generate the stacked data 350 by stacking one or more of channels (for example, channel 0 and channel 1 of the first feature map 310) included in the first feature map and one or more of channels (for example, channel 0 and channel 1 of the second feature map 320) included in the second feature map in a channel direction.

The processor 200 may generate a stacked kernel 340 by stacking one or more of kernels included in the data.

The processor 200 may perform a neural network operation in parallel based on the stacked data 350. The processor 200 may perform a convolution operation with the stacked kernel 340 by inputting the stacked data 350 to the MAC engine 360.

As an operation result, the processor 200 may generate convolution outputs 370.

In a conventional method, total operation time may be represented by Equation 1.

Total time=max(IFM 1, Weight 1)load+Conv1 exec+Conv 2 exec+OFM 2 [Equation 1]

When the processor 200 performs a plurality of convolution operations (for example, Conv 1 and Conv 2), total operation time may be represented by Equation 2 and may be reduced by performing optimization through stacking input feature maps (for example, the first feature map 310 and the second feature map 320).

Total time=max(IFM 1, Weight 1)load+max(Conv1, Conv 2)exec+max(OFM1, OFM2)Store [Equation 2]

As an example of FIG. 4, the processor 200 may optimize operation time by stacking a portion of an input feature map (for example, a channel of an input feature map). The processor 200 may reduce MAC operation execution time by approximately one half by simultaneously performing a first convolution (for example, Conv 1) and a second convolution (for example, Conv 2) without memory overhead.

Figure 5:
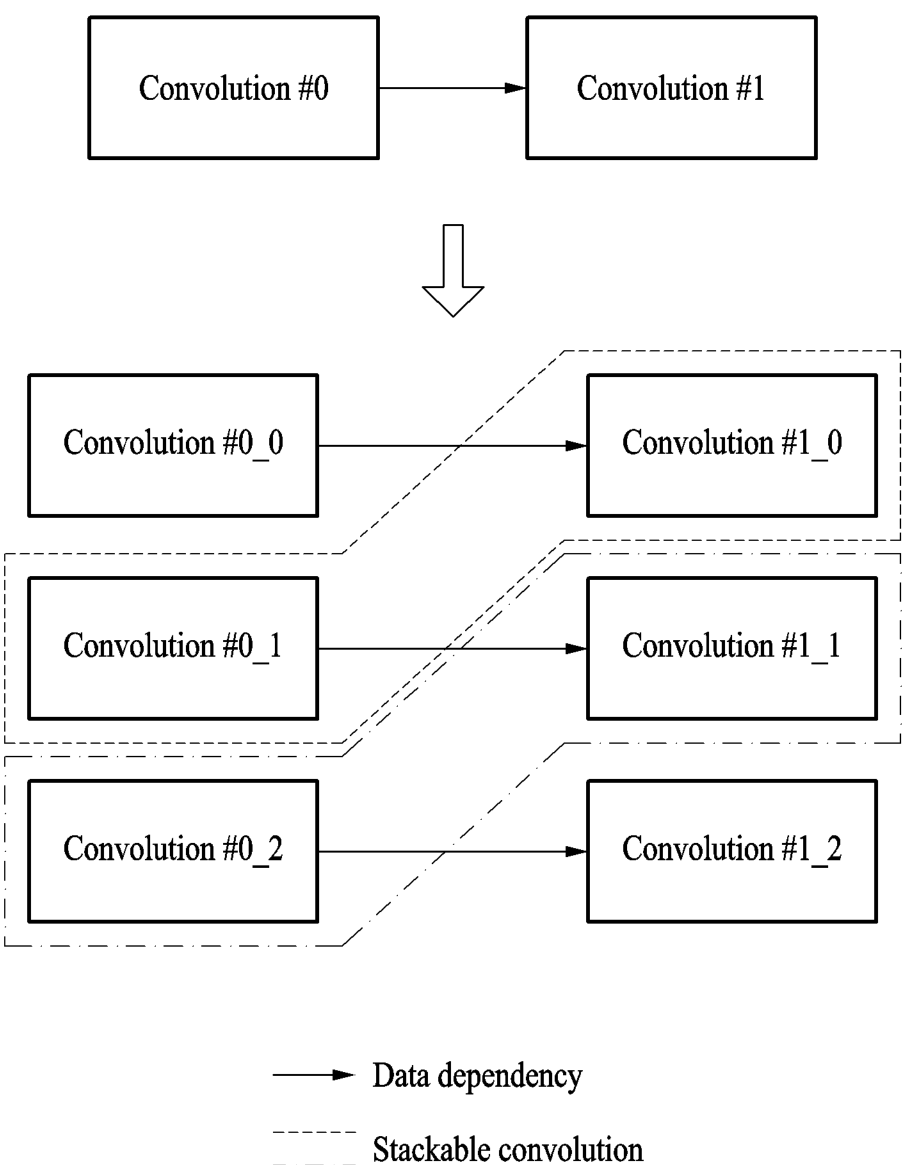
FIG. 5 illustrates an example of a stacking operation based on a data dependency.

FIG. 5 illustrates an example of stacking operation based on a data dependency.

Referring to FIG. 5, a processor (for example, the processor 200 of FIG. 1) may determine whether segmenting data is beneficial. The processor 200 may generate a plurality of tiles by segmenting the data to have a width or a height. In an example, the width and height may be predetermined. In another example, the data may be segmented based on a threshold for each of the height and the width. The processor 200 may generate stacked data by stacking the plurality of tiles.

When an input feature map is sufficiently large, the processor 200 may stack two tiled portions (for example, tiles) of same shallow convolutions. The stacking method described in FIGS. 2 to 4 may be identically applied to a case in which same original convolutions are segmented into a plurality of tiles and stacked.

The processor 200 may perform stacking for two consecutive convolutions having a small number of unaligned input channels. However, when a dependency between convolution operations is present as an example of FIG. 5, the stacking method described in FIGS. 2 to 4 may not be applied because a data dependency interrupts parallel execution.

The processor 200 may apply a stack optimization technique even when a data dependency is present.

An example of FIG. 5 may represent a process of performing optimization for two consecutively tiled convolutional layers of which execution times are dominantly affected by a MAC engine.

In an example of FIG. 5, a data dependency may be represented as follows.

Conv#0 Tile #0→Conv#1 Tile#0

Conv#0 Tile#1→Conv#1 Tile#1

Conv#0 Tile#2→Conv#1 Tile#2

In this case, the processor 200 may perform stacking for Conv#1 Tile#0 and Conv#0 Tile#1. The processor 200 may stack Conv#1 Tile#1 and Conv#0 Tile#2.

Performing stacking for a plurality of convolutions may include a stacking process of a kernel and an input feature map used in a convolution operation.

The stack optimization process described above may be similarly applied to a case in which dependencies are more complicated (for example, in case a halo is requiring) than those of an example of FIG. 5, that is, case in which a tiling size greater than or equal to 4 is needed to fill up an execution pipeline.

Through the example tiling and stacking processes of FIG. 5, execution time may be reduced. The processor 200 may prevent memory reuse such as loading an unnecessary feature map (for example, a second feature map) from a memory (for example, DRAM). The processor 200 may hide execution time of Conv#1 Tile#0 and Conv#1 Tile#1 by stacking the first convolution and the second convolution execution operations.

Figure 6:
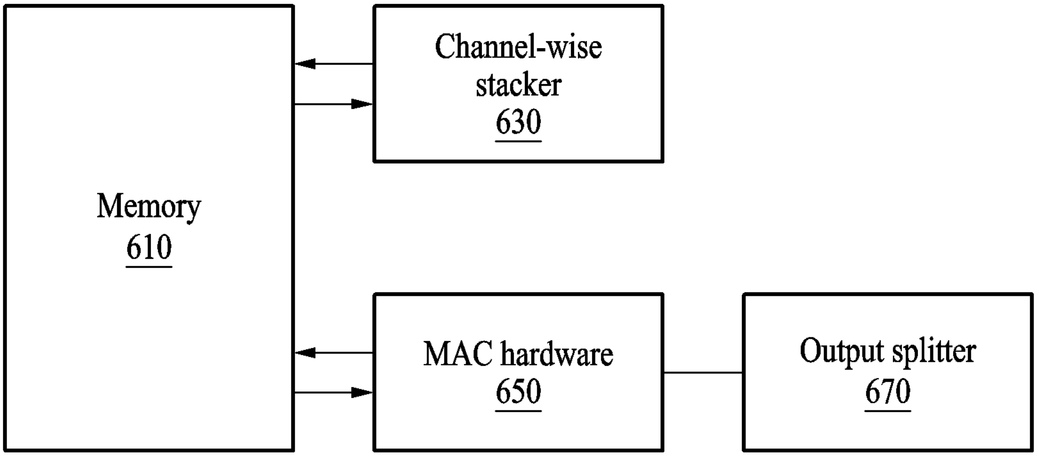
FIG. 6 illustrates another example of an implementation of the neural network operation apparatus of FIG. 1.

FIG. 6 illustrates another example of implementation of the neural network operation apparatus of FIG. 1.

Referring to FIG. 6, a neural network operation apparatus (for example, the neural network operation apparatus 10 of FIG. 1) may include a memory 610 (for example, the memory 300 of FIG. 1), a channel-wise stacker 630, a MAC hardware 650 and an output splitter 670.

The channel-wise stacker 630 may stack channel-aligned shallow inputs into one combined input.

The MAC hardware 650 may perform a MAC operation. The output splitter 670 may generate an output for a plurality of stacked convolutions by one hardware invocation.

When N shallow aligns are present in the memory 610, the channel-wise stacker 630 may perform optimization for multi-group execution by stacking the N shallows aligns in a compact stacking manner.

Stacked inputs may be processed at once through the MAC hardware 650 and different outputs for the stacked inputs may be split by the output splitter 670.

Through the above-described configuration, the neural network operation apparatus 10 may reduce memory overhead for a shallow input since the neural network operation apparatus 10 may reduce a quantity of garbage data in unaligned channels by input channel stacking.

The neural network operation apparatus 10 may enhance operation speed by processing a plurality of operations at once in parallel.

Figure 7:
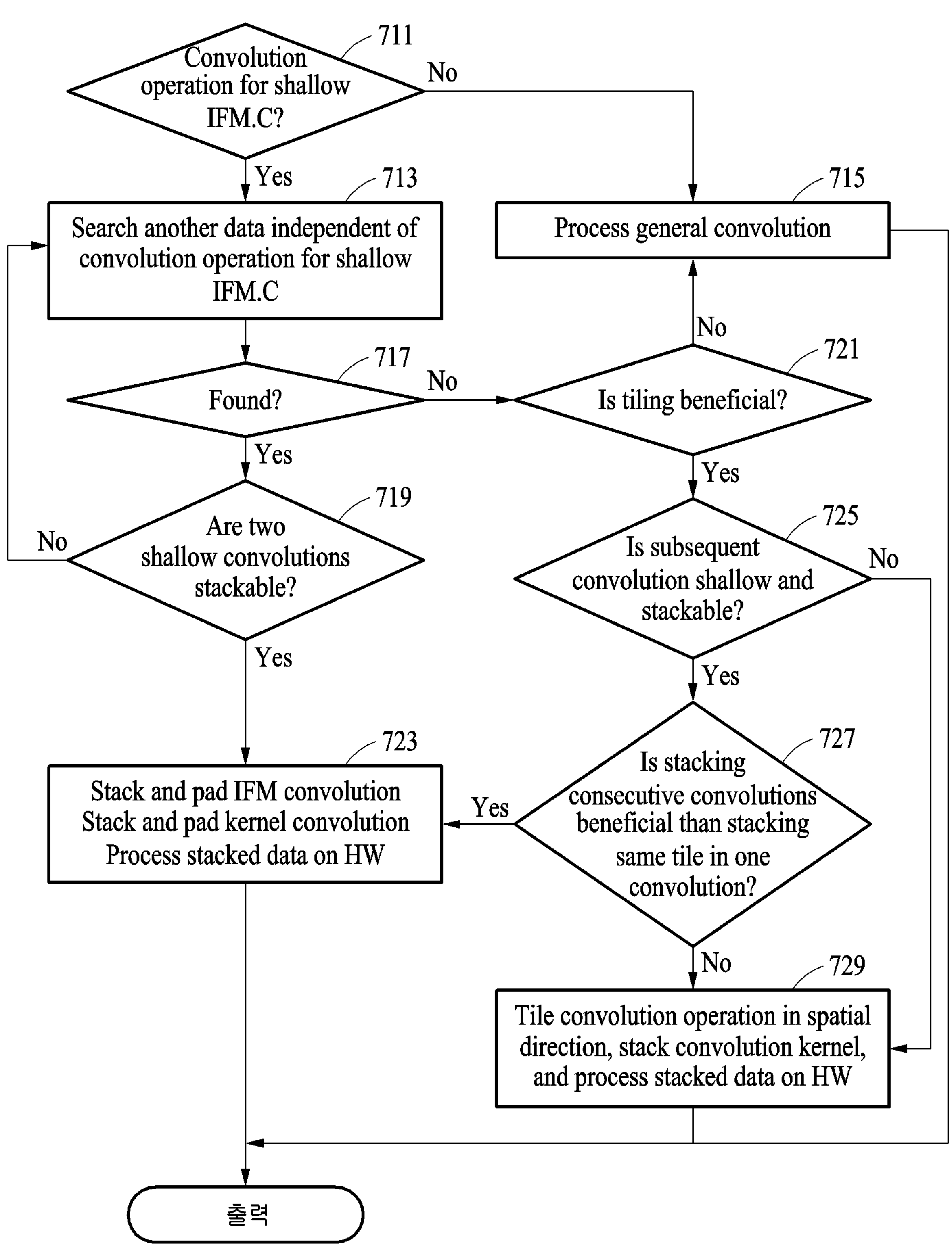
FIG. 7 illustrates a flowchart of performing stacking and the neural network operation.

FIG. 7 illustrates an example of performing stacking and the neural network operation. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer, such as a processor, that perform the specified functions, or combinations of special purpose hardware and computer instructions. The description provided with reference to FIGS. 1 through 6 also applies to the description of FIG. 7, and are incorporated herein by reference. Thus, a detailed description of FIGS. 1-6 will be omitted for conciseness.

Referring to FIG. 7, the processor (for example, the processor 200 of FIG. 1) may determine whether a size of data is less than or equal to a particular size. In an example, the processor may determine whether a size of data is less than or equal to a threshold. For example, in operation 711, the processor 200 may determine whether a convolution operation is for a shallow input feature map channel.

If a convolution is for the shallow input feature map channel, in operation 713, the processor 200 may search for other data independent of the convolution operation of operation 711. If the convolution is not for the shallow input feature map channel, in operation 715, the processor 200 may perform general convolution processing.

In operation 717, the processor 200 may determine whether other independent data is discovered. If other independent data is discovered, in operation 719, the processor 200 may determine whether two different convolutions are stackable. If other independent data is not discovered, in operation 721, the processor 200 may determine whether tiling is beneficial.

If two shallow convolutions are stackable, in operation 723, the processor 200 may perform a convolution by stacking an input feature map and a kernel. The processor 200 may perform a convolution operation based on stacked data using hardware such as a MAC engine by stacking and padding the input feature map and kernel.

If tiling is not beneficial, in operation 715, the processor 200 may perform general convolution processing. If tiling is beneficial, in operation 725, the processor 200 may determine whether a subsequent convolution is shallow and stackable.

If the subsequent convolution is shallow and stackable, in operation 727, the processor 200 may sequentially perform stacking and may determine whether stacking the subsequent convolution is beneficial compared to stacking a same tile in one convolution. If the subsequent convolution is not shallow and not stackable or stacking the subsequent convolution is not beneficial compared to stacking a same tile in one convolution, in operation 729, the processor 200 may process stacked data in hardware such as a MAC engine by tiling in a spatial direction and stacking the convolution kernel.

If stacking the subsequent convolution is beneficial compared to stacking a same tile in one convolution, in operation 723, the processor 200 may perform a convolution by stacking an input feature map and kernel.

As described above, stacking may be performed in three ways. A first case may be stacking two independent convolutions, a second case may be stacking different tiles in a same convolution, and a third case may be stacking a dependent convolution.

If more than one option is available, stacking independent convolutions may be desirable, however, the processor 200 may determine an optimal stacking method according to software and/or hardware implementation.

Through the above-described stacking methods, hardware utilization rate may be enhanced by processing a neural network operation in parallel on hardware. The processor 200 may reduce memory footprint for an operation input by using a compactly stacked layout for an input feature map.

Figure 8:
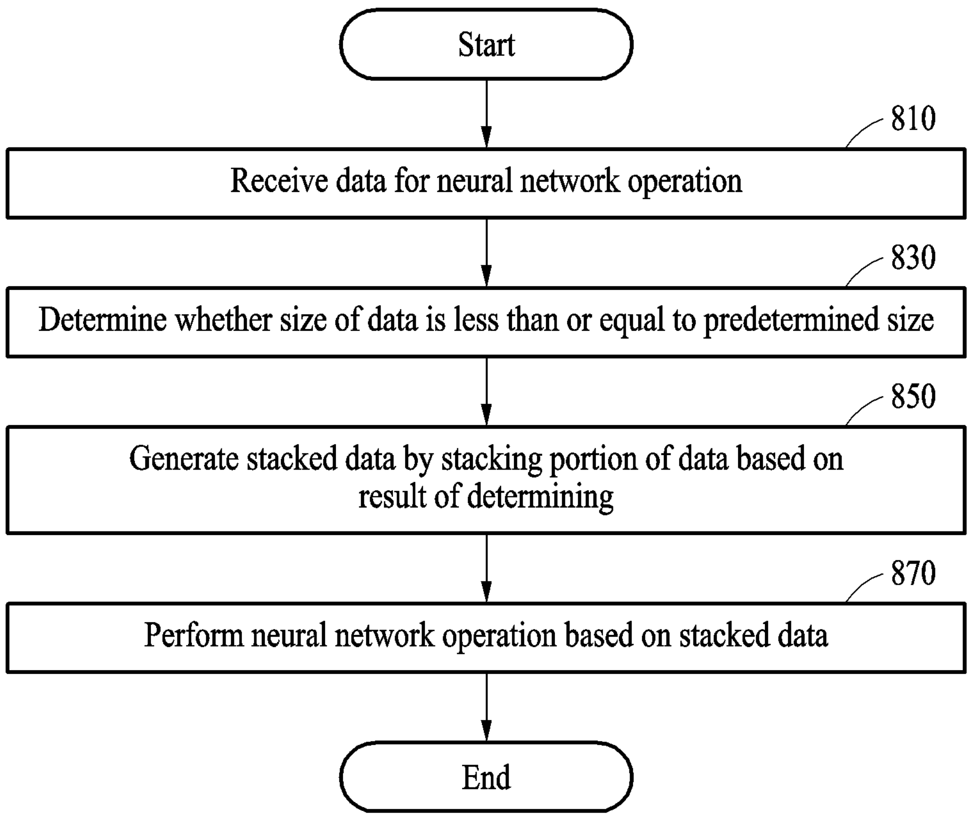
FIG. 8 illustrates a flowchart of operations of the neural network operation apparatus of FIG. 1.

FIG. 8 illustrates an example of an operation of the neural network operation apparatus of FIG. 1. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer, such as a processor, that perform the specified functions, or combinations of special purpose hardware and computer instructions. The description provided with reference to FIGS. 1 through 7 also applies to the description of FIG. 8, and are incorporated herein by reference. Thus, a detailed description of FIGS. 1-7 will be omitted for conciseness.

Referring to FIG. 8, in operation 810, a receiver (for example, the receiver 100 of FIG. 1) may receive data for a neural network operation. The receiver 100 may receive subsequent data of the data for the neural network operation.

In operation 830, the processor 200 may determine whether a size of the data is less than or equal to a size. In an example, the size may be predetermined.

In operation 850, the processor 200 may generate stacked data by stacking a portion of the data based on a result of determining whether the size of the data is less than or equal to the size. The processor 200 may store a portion of a first feature map included in the data in a first location of the memory 300. The processor 200 may generate a stacked feature map by stacking a second feature map included in the data at a location adjacent to the first location.

The processor 200 may generate stacked data by stacking one or more of channels included in the first feature map and one or more of channels included in the second feature map in a channel direction.

The processor 200 may generate a stacked kernel by stacking one or more of kernels included in the data.

The processor 200 may determine whether segmenting the data is beneficial. The processor 200 may generate a plurality of tiles by segmenting the data to have a width or a height. In an example, the width and height may be predetermined. The processor 200 may generate the stacked data by stacking the plurality of tiles.

The processor 200 may generate the stacked data by inputting the data to a DMA engine.

The processor 200 may search for additional data to be used to perform a second neural network operation that is different from a first neural network operation performed based on the data. The processor 200 may determine whether the additional data and the data are stackable. The processor 200 may perform the first neural network operation and the second neural network operation by stacking the additional data and the data based on a result of determining.

The processor 200 may determine whether a size of the subsequent data is less than or equal to a size and whether the subsequent data is stackable. In an example, the size may be predetermined. The processor 200 may perform neural network operations by stacking a portion of the subsequent data based on a result of determining and a dependency between the data and the subsequent data.

In operation 870, the processor 200 may perform the neural network operations in parallel based on the stacked data.

The apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The software may include a computer program, a piece of code, an instruction, or some combination thereof, to independently or uniformly instruct or configure the processing device to operate as desired. Software and data may be embodied permanently or temporarily in any type of machine, component, physical or pseudo equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

The Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the neural network operation method. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A neural network operation method comprising:

receiving data for a neural network operation, the data comprising a first map that is a feature map comprising first valid channels, and comprising a second map that is a feature map comprising second valid channels;

determining whether a size of the data is less than or equal to a threshold;

in response to a determination that the size of the data is less than or equal to the threshold, generating stacked data based on combining at least a portion of the first map with at least a portion of the second map such that a last valid channel of the first map is adjacent to a first valid channel of the second map in the stacked data; and performing a first convolution operation for the first map and a second convolution operation for the second map in parallel using the stacked data; and generating, in parallel, a first output of a result of the first convolution operation and a second output of a result of the second convolution operation, wherein a number of outputs generated based on a convolution operation on the stacked data is equal to a number of feature maps used to generate the stacked data.

2. The neural network operation method of claim 1, wherein the performing comprises performing a convolution operation between the stacked data and a stacked kernel corresponding to the stacked data.

3. The neural network operation method of claim 1, wherein the generating of the stacked data comprises:

generating tiles by segmenting the data to have a predetermined width or a predetermined height; and generating the stacked data by stacking the tiles.

4. The neural network operation method of claim 1, wherein the generating of the stacked data comprises generating the stacked data by inputting the data to a direct memory access (DMA) engine.

5. The neural network operation method of claim 1, wherein the generating of the stacked data further comprises:

searching for additional data to perform a second neural network operation that is different from the neural network operation performed based on the data;

determining whether the additional data and the data are stackable; and performing the neural network operation and the second neural network operation in parallel by stacking the additional data and the data based on a result of the determining whether the additional data and the data are stackable.

6. A non-transitory computer-readable storage medium storing instructions that, when executed by a processor, cause the processor to perform the method of claim 1.

7. A neural network operation apparatus comprising:

one or more processors; and a memory storing instructions that when executed by the one or more processors cause the neural network operation apparatus to:

determine whether a size of the data for a neural network operation is less than or equal to a threshold, the data comprising a first map that is a feature map comprising first valid channels, and comprising a second map that is a feature map comprising second valid channels, in response to a determination that the size of the data is less than or equal to the threshold, generate stacked data based on combining at least a portion of the first map with at least a portion of the second map such that a last valid channel of the first map is adjacent to a first valid channel of the second map, perform a first convolution operation for the first map and a second convolution operation for the second map in parallel using the stacked data, and generate, in parallel, a first output of a result of the first convolution operation and a second output of a result of the second convolution operation, wherein a number of outputs generated based on a convolution operation on the stacked data is equal to a number of feature maps used to generate the stacked data.

8. The neural network operation apparatus of claim 7, wherein the instructions are further configured to cause the neural network operation apparatus to perform a convolution operation between the stacked data and a stacked kernel corresponding to the stacked data.

9. The neural network operation apparatus of claim 7, wherein the instructions are further configured to cause the neural network operation apparatus to:

generate tiles by segmenting the data to have a predetermined width or a predetermined height, and generate the stacked data by stacking the tiles.

10. The neural network operation apparatus of claim 7, wherein the instructions are further configured to cause the neural network operation apparatus to generate the stacked data by inputting the data to a direct memory access (DMA) engine.

11. The neural network operation method of claim 1, wherein, in the stacked data, the first valid channel is self-contiguous and the second valid channel is self-contiguous.

12. The neural network operation apparatus of claim 7, wherein, in the stacked data, the first valid channel is self-contiguous and the second valid channel is self-contiguous.

* * * * *